US008251825B2

(12) United States Patent
Sylla

(10) Patent No.: US 8,251,825 B2
(45) Date of Patent: Aug. 28, 2012

(54) APPLYING GRAPHICAL CHARACTERISTICS TO GRAPHICAL OBJECTS IN A WAGERING GAME MACHINE

(75) Inventor: Craig J. Sylla, Round Lake, IL (US)

(73) Assignee: WMS Gaming Inc., Waukegan, IL (US)

( * ) Notice: Subject to any disclaimer, the term of this patent is extended or adjusted under 35 U.S.C. 154(b) by 830 days.

(21) Appl. No.: 12/376,667

(22) PCT Filed: Aug. 13, 2007

(86) PCT No.: PCT/US2007/017903

§ 371 (c)(1), (2), (4) Date: Feb. 6, 2009

(87) PCT Pub. No.: WO2008/021310

PCT Pub. Date: Feb. 21, 2008

(65) Prior Publication Data

US 2010/0184518 A1 Jul. 22, 2010

Related U.S. Application Data

(60) Provisional application No. 60/822,350, filed on Aug. 14, 2006.

(51) Int. Cl.

| | |
|---|---|
| ***A63F 13/00*** | (2006.01) |
| ***A63F 9/24*** | (2006.01) |
| ***G06F 17/00*** | (2006.01) |
| ***G06F 19/00*** | (2011.01) |

(52) U.S. Cl. ........................................................ 463/43

(58) Field of Classification Search ........................ None
See application file for complete search history.

(56) References Cited

U.S. PATENT DOCUMENTS

| | | | |
|---|---|---|---|
| 6,866,585 | B2 | 3/2005 | Muir |
| 6,887,157 | B2 | 5/2005 | LeMay et al. |
| 2003/0064781 | A1 | 4/2003 | Muir |
| 2004/0053686 | A1 | 3/2004 | Pacey et al. |
| 2004/0102244 | A1 | 5/2004 | Kryuchkov et al. |
| 2004/0102245 | A1 | 5/2004 | Escalera et al. |
| 2004/0192430 | A1 | 9/2004 | Burak et al. |
| 2004/0266536 | A1 | 12/2004 | Mattice et al. |
| 2005/0037843 | A1 | 2/2005 | Wells et al. |

(Continued)

FOREIGN PATENT DOCUMENTS

WO WO-2004002591 A2 1/2004

(Continued)

OTHER PUBLICATIONS

"International Application Serial No. PCT/US07/17903, International Search Report and Written Opinion, mailed Aug. 6, 2008," 10 pgs.

*Primary Examiner* — Thien F Tran

(74) *Attorney, Agent, or Firm* — Schwegman, Lundberg & Woessner, P.A.

(57) ABSTRACT

Systems and methods for providing programs on wagering game machine peripherals are described. The programs may be shader programs for execution by one or more programmable shaders on a graphics processing unit. The programs may provide a graphical result, e.g. an output on a display, or may provide a non-graphical result of a computation to a general purpose processor on the wagering game machine.

19 Claims, 7 Drawing Sheets

U.S. PATENT DOCUMENTS

| | | | | |
|---|---|---|---|---|
| 2005/0059487 | A1 | 3/2005 | Wilder et al. | |
| 2005/0075167 | A1 | 4/2005 | Beaulieu et al. | |
| 2005/0215319 | A1 | 9/2005 | Rigopulos et al. | |
| 2005/0255908 | A1 | 11/2005 | Wells | |
| 2006/0009286 | A1 * | 1/2006 | Durham et al. | 463/30 |
| 2006/0052152 | A1 | 3/2006 | Tedsen et al. | |
| 2006/0176303 | A1 | 8/2006 | Fairclough | |
| 2007/0004501 | A1 * | 1/2007 | Brewer et al. | 463/25 |

FOREIGN PATENT DOCUMENTS

| | | | |
|---|---|---|---|
| WO | WO-2004028650 | A1 | 4/2004 |
| WO | WO-2004029893 | A1 | 4/2004 |
| WO | WO-2006039257 | A1 | 4/2006 |
| WO | WO-2006039348 | A1 | 4/2006 |
| WO | WO-2006039371 | A2 | 4/2006 |

* cited by examiner

APPLYING GRAPHICAL CHARACTERISTICS TO GRAPHICAL OBJECTS IN A WAGERING GAME MACHINE

RELATED APPLICATION

This patent application is a U.S. National Stage Filing under 35 U.S.C. 371 from International Patent Application Serial No. PCT/US2007/017903 filed Aug. 13, 2007, and published on Feb. 21, 2008, as WO 2008/021310 A2 which claims the priority benefit of U.S. Provisional Patent Application Ser. No. 60/822,350 filed Aug. 14, 2006 and entitled "SYSTEMS AND METHODS FOR APPLYING GRAPHICAL CHARACTERISTICS TO GRAPHICAL OBJECTS IN A WAGERING GAME MACHINE", which applications are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007, WMS Gaming, Inc.

FIELD

Embodiments of the inventive subject matter relate generally to wagering game systems, and more particularly, to systems and methods for applying graphical characteristics to graphical objects on wagering game machines.

BACKGROUND

Wagering game machine makers continually provide new and entertaining games. One way of increasing entertainment value associated with casino-style wagering games (e.g., video slots, video poker, video black jack, and the like) includes offering a variety of base games and bonus events. However, despite the variety of base games and bonus events, players often lose interest in repetitive wagering gaming content. In order to maintain player interest, wagering game machine makers frequently update wagering game content with new game themes, game settings, bonus events, game software, and other electronic data. In addition, in order to maintain player interest, wagering game machine makers may provide wagering game machines that display three-dimensional renderings of graphical objects associated with the wagering game machine. These three-dimensional rendering may provide more realistic images of wagering game symbols, characters, or other objects.

BRIEF DESCRIPTION OF THE FIGURES

Embodiments of the invention are illustrated by way of example and not limitation in the Figures of the accompanying drawings in which.

DESCRIPTION OF THE EMBODIMENTS

Example Operating Environment

Figure 1A:
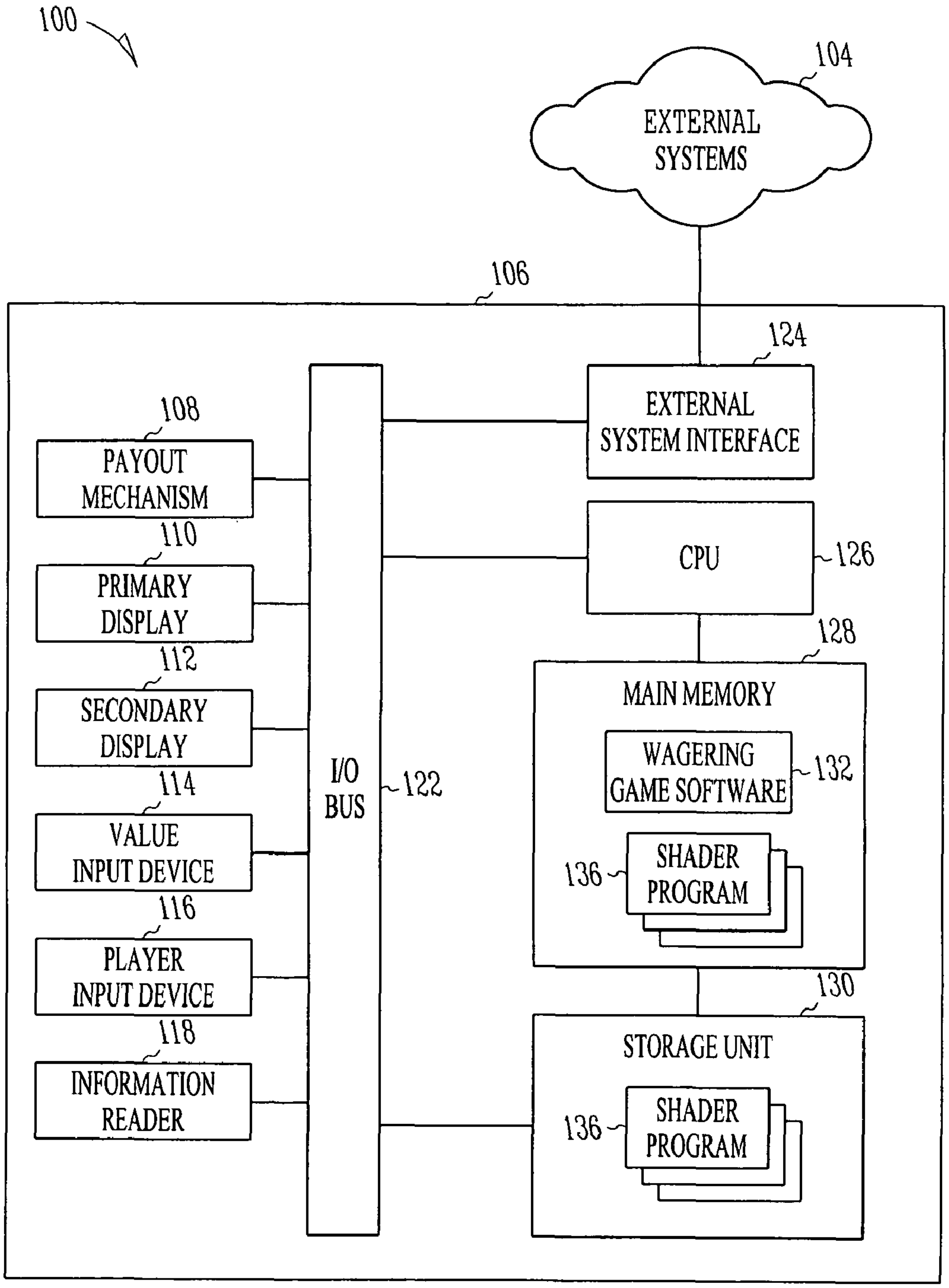
FIG. 1A is a block diagram illustrating a wagering game machine architecture, including a control system, according to example embodiments of the invention.

FIG. 1A is a block diagram illustrating a wagering game machine architecture 100, including a control system, according to example embodiments of the invention. As shown in FIG. 1, the wagering game machine 106 includes a central processing unit (CPU) 126 connected to main memory 128, which may store wagering game software 132. In one embodiment, the wagering game software can include software associated with presenting wagering games, such as video poker, video black jack, video slots, video lottery, etc., in whole or part. In addition, wagering game software 132 may include bonus rounds, themes, advertising content, attract mode content, pay tables, denomination tables, audio files, video files, operating system files and other software associated with a wagering game or the operation of a wagering game machine.

The CPU 126 is also connected to an input/output (I/O) bus 122, which facilitates communication between the wagering game machine's components. The I/O bus 122 is connected to a payout mechanism 108, primary display 110, secondary display 112, value input device 114, player input device 116, information reader 118, and storage unit 130. The player input device 116 can include the value input device 114 to the extent the player input device 116 is used to place wagers. The I/O bus 122 is also connected to an external system interface 124, which is connected to external systems 104 (e.g., wagering game networks).

Figure 2:
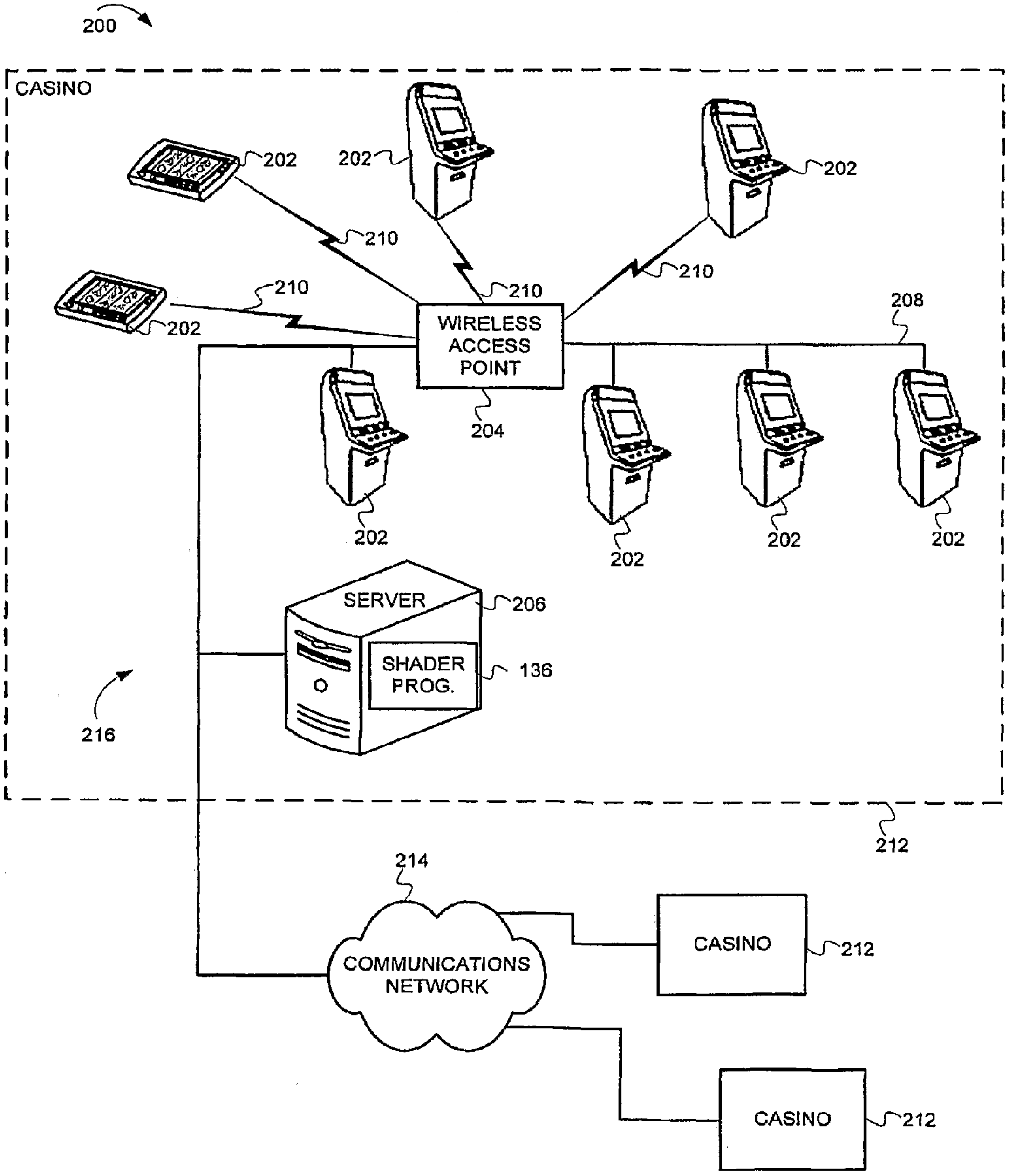
FIG. 2 is a block diagram illustrating a wagering game network, according to example embodiments of the invention.

Wagering game software 132 may be loaded from storage unit 130, or it may be loaded from external systems 104 such as servers of other systems on a wagering game network (illustrated further in FIG. 2). In general, wagering game software 132 comprises modules or units that operate to present one or more wagering game upon which monetary value may be wagered. During the course of presenting the wagering games, images composed of graphical objects are displayed on primary display 110 and/or secondary display 112. The graphical objects may represent various wagering game elements such as reels, cards, dice, symbols, animations, etc., and may also represent elements of a bonus round or other ancillary wagering game software component.

Storage unit 130 and/or main memory 128 may store a shader program 136. Shader program 136 comprises a program that is designed to operate on a graphics processor that may be part of primary display 110 or secondary display 112. Shader programs 136 may also be received from an external system 104, for example via external system interface 124. In general, shader program 136 may be downloaded to the graphics processor for execution on the graphics processor, and provides commands and/or data that control the rendering of graphical objects processed by the graphics processing unit. The shader program may apply graphical characteristics such as texture, shadowing, lighting etc. to graphical objects rendered by the graphics processing unit. Further details on the operation of shader programs on a graphics processor are provided below.

In one embodiment, the wagering game machine 106 can include additional peripheral devices and/or more than one of each component shown in FIG. 1. For example, the peripherals may include a bill validator, a printer, a coin hopper, a button panel, or any of the many peripherals now found in wagering game machines or developed in the future. Further, in some embodiments, the wagering game machine 106 can include multiple external system interfaces 124 and multiple CPUs 126. In one embodiment, any of the components can be integrated or subdivided. Additionally, in one embodiment, the components of the wagering game machine 106 can be interconnected according to any suitable interconnection architecture (e.g., directly connected, hypercube, etc.).

Figure 1B:
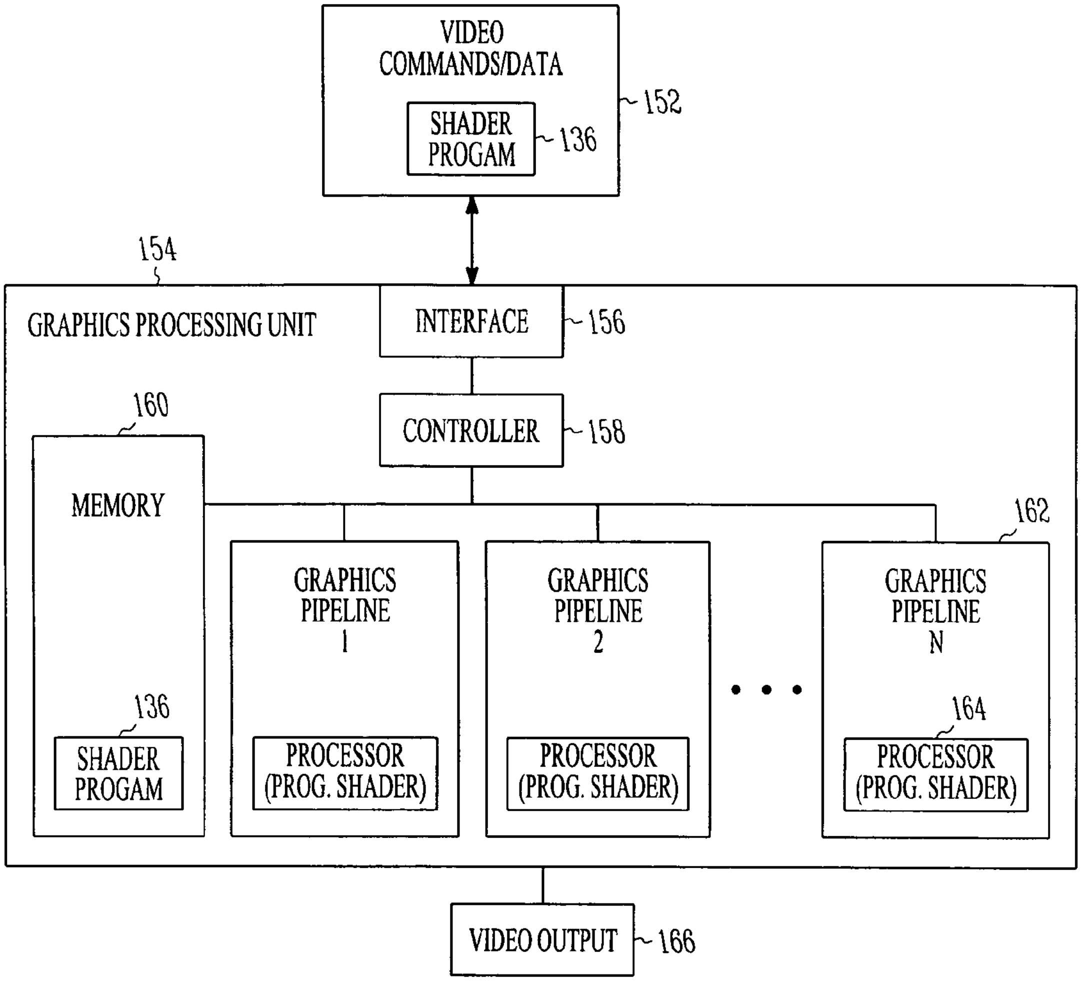
FIG. 1B is a block diagram illustrating a graphics processing unit according to example embodiments of the invention.

FIG. 1B is a block diagram illustrating a graphics processing unit 154 according to example embodiments of the invention. In general, graphics processing unit 154 processes three-dimensional graphics data and may be included as part of primary display 110 and/or secondary display 112. Graphics processing unit 154 receives video commands and data 152 from CPU 126 and produces video output 166 for presentation on a display coupled to the graphics processing unit 154. In some embodiments, graphics processing unit 154 includes an interface 156, a controller 158, memory 160 and implements one or more graphics pipelines 162. While the embodiments of the invention are not limited to any particular graphics processing unit 154, some embodiments use a graphics processing unit from the ATI RADEON® family of graphics processing units available from ATI Technologies Inc. of Markham, Ontario Canada.

Interface 156 provides an interface between CPU 126 and graphics processing unit 154. Interface 156 may be an I/O (input/output) interface or a bridge device to interface directly to CPU 126. Examples of interface 156 include the Intel Northbridge and the Intel Southbridge type interfaces.

Commands/Data 152 received at Interface 156 may be processed by Controller 158. Controller 158 may be a processor used to coordinate and manage processing of video data by the graphics processing unit 154. For example, controller 158 may control the placement of commands and data into memory 160, and may manage commands and data passed to the one or more graphics pipelines 162.

As noted above, graphics processing unit 154 may include one or more graphics pipelines 162. In some embodiments, graphics processing unit may include 48 graphics pipelines 162. The inclusion of multiple graphics pipelines 162 on a graphics processing unit 154 enables graphics commands and data to be processed in parallel.

The graphics pipelines 162 may each include a processor 164. In some embodiments, the processor 164 may be referred to as a programmable shader. It should be noted that other processors may also be included as part of graphics pipeline 162. For example, a geometry processor and/or a rasterizer may also be included in a pipeline 162. Other processors or computation units may be included and may perform a variety of specialized functions that can include table lookups, scalar and vector addition, multiplication, division, coordinate-system mapping, calculation of vector normals, tessellation, calculation of derivatives, interpolation, and the like.

Programmable shader 164 may execute a shader program 136 loaded into memory 160 at run-time by controller 158. The shader program may be received from CPU 126 through interface 152. In some embodiments, shader program 136 may be specified in a shader programming language that is proprietary to the graphics processing unit manufacturer. In alternative embodiments, a set or subset of "standardized" graphics operations commands and/or data may be supported. Examples of such standardized operations include various versions of DirectX or OpenGL languages.

The commands and/or data comprising shader program 136 for execution by programmable shader 164 in general include commands and/or data that control various aspects that affect the rendering of final surface properties of graphical objects to be presented on a display of a wagering game machine. For example, shader program 136 may include operations that include the calculation of one or more of: texture mapping, bump mapping, light mapping (light absorption, diffusion, reflection, refraction, shadowing), specular mapping, surface displacement, and other post-processing effects. Various parameters controlling the shading may be passed as parameters to the shader program. For example, the number of lights and lighting parameters (intensity, color etc.) may be passed as parameters to the shader program.

Various embodiments may implement one or various types of programmable shaders depending on the capabilities and requirements of a particular graphical processing unit 154. In general, the various types of programmable shaders include vertex shaders, geometry shaders, and pixel shaders. Multiple types of programmable shaders may exist on a graphics processing unit at the same time.

In general, vertex shaders operate on each vertex in a model containing three-dimensional graphical objects. Vertex shaders define a method to compute vector space transformations and other computations. In some embodiments, vertex type of programmable shader operates on basic data types, so graphical objects composed of complex structures are broken down before being passed to the vertex shader. The vertex shader receives the vertex positions of the graphical object in addition to parameters controlling the shading and positioning of the vertices defining the graphical object or objects. Functions that may be applied to the data include mesh deformation, vertex displacements, and texture coordinate transformations.

In general, pixel shaders may be used to compute pixel properties such as pixel color. Pixel shaders are typically applied for each pixel in a graphical object being processed in the pipeline. As with vertex shaders, various parameters may be supplied to the shader program to control lighting and texture computations applied to the set of pixels through the operation of the shader. For example, the parameters may specify the number, positions, intensities, and colors of one or more lights illuminating the graphical objects in a three-dimensional model.

In general, geometry shaders operate on vertices that may be grouped into primitives such as triangles, lines, strips and points. The vertices may comprise output from a vertex shader. Additionally, geometry shaders may make copies of input primitives, and as a result create new sets of vertices.

As discussed above, various parameters may be supplied to control lighting and shading. In some embodiments, the shaders may implement various types of shading models, including Gouraud shading, Phong shading and/or bump mapping.

In the embodiments described above, a processor 164 on the graphics processing unit 154 executes a shader program operable to control the shading of graphical objects presented by a wagering game on a wagering game machine. In alternative embodiments, the processor 164 may provide a command set and programming language that is sophisticated enough to do more generalized processing. In these embodiments, a processor 164 may be programmed to provide non-graphical results to a CPU 126. For example, the processor 164 may be loaded with a program that generates a random number (alternatively referred to as a pseudo-random number). Also, the processor 164 may be loaded with a program to perform encryption/decryption or other data transformation/data processing functions.

Further, it should be noted that in the discussion of various embodiments provided above, the configuration and operation of a graphics processing peripheral for a wagering game machine has been described. In alternative embodiments, other types of peripherals have one or more processors may be used instead of or in addition to a graphics processing unit 154. For example, an audio peripheral having multiple processors may be used. Other types of peripherals having available processors and processing capacity may be used in various embodiments.

Example Wagering Game Network

FIG. 2 is a block diagram illustrating a wagering game network, according to example embodiments of the invention. As shown in FIG. 2, the wagering game network 200 includes a plurality of casinos 212 connected to a communications network 214.

Some or all of the plurality of casinos 212 include a local area network 216, which includes a wireless access point 204, wagering game machines 202, and a wagering game server 206 that can serve wagering games over the local area network 216. In some embodiments, wagering game server 206 may serve one or more shader programs 136 that may be distributed to wagering game machines within a casino. To facilitate such communications, the local area network 216 may include wireless communication links 210 and/or wired communication links 208. The wired and wireless communication links can employ any suitable connection technology, such as Bluetooth, 802.11, Ethernet, public switched telephone networks, SONET, etc. In one embodiment, the wagering game server 206 can serve wagering games and/or distribute shader programs 136 to devices located in other casinos 212 or at other locations on the communications network 214.

The wagering game machines 202 and wagering game server 206 can include hardware and machine-readable media including instructions for performing the operations described herein.

The wagering game machines 202 described herein can take any suitable form, such as floor standing models, handheld mobile units, bartop models, workstation-type console models, etc. Further, the wagering game machines 202 can be primarily dedicated for use in conducting wagering games, or can include non-dedicated devices, such as mobile phones, personal digital assistants, personal computers, etc. In one embodiment, the wagering game network 200 can include other network devices, such as accounting servers, wide area progressive servers, player tracking servers, and/or other devices suitable for use in connection with embodiments of the invention.

Example Wireless Environment

In some embodiments, the wireless access point 204 and wagering game machines 202 can communicate using any now know or future developed wireless communications signals. Examples of such signals include orthogonal frequency division multiplexed (OFDM) communication signals over a multicarrier communication channel, spread-spectrum signals.

In some embodiments, the wireless access point 204 can be included in a communication station, such as wireless local area network (WLAN) communication station including a Wireless Fidelity (WiFi) communication station, or a WLAN access point (AP). In these embodiments, the wagering game machines 202 can be included in a mobile station, such as WLAN mobile station or a WiFi mobile station.

In some embodiments, the wireless access point 204 can be included in a broadband wireless access (BWA) network communication station, such as a Worldwide Interoperability for Microwave Access (WiMax) communication station, since the wireless access point 204 can be included in almost any wireless communication device. The wagering game machines 202 can also form part of a BWA network communication station, such as a WiMax communication station.

In some embodiments, the wireless access point 204 and the wagering game machines 202 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 204 and the wagering game machines 202 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In other embodiments, the wireless access point 204 and the wagering game machines 202 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the wireless access point 204 and the wagering game machines 202 can communicate in accordance with an ultra-wideband (UWB) communication technique where a carrier frequency is not used. In other embodiments, the wireless access point 204 and the wagering game machines 202 can communicate in accordance with an analog communication technique. In other embodiments, the wireless access point 204 and the wagering game machines 202 can communicate in accordance with an optical communication technique, such as the Infrared Data Association (IrDA) standard. In some embodiments, the wireless access point 204 and the wagering game machines 202 can communicate in accordance with the Home-RF standard which can be in accordance with a Home-RF Working Group (HRFWG) standard.

In some embodiments, the wireless access point 204 can be part of a communication station, such as wireless local area network (WLAN) communication station including a Wireless Fidelity (WiFi) communication station, or a WLAN access point (AP). In these embodiments, the wagering game machines 202 can be part of a mobile station, such as WLAN mobile station or a WiFi mobile station.

In some other embodiments, the wireless access point 204 can be part of a broadband wireless access (BWA) network communication station, such as a Worldwide Interoperability for Microwave Access (WiMax) communication station, as the wireless access point 204 can be part of almost any wireless communication device. In these embodiments, the wagering game machines 202 can be part of a BWA network communication station, such as a WiMax communication station.

In some embodiments, the wireless access point 204 and the wagering game machines 202 can communicate in accordance with standards such as the Pan-European mobile system standard referred to as the Global System for Mobile Communications (GSM). In some embodiments, the wireless access point 204 and the wagering game machines 202 can also communicate in accordance with packet radio services such as the General Packet Radio Service (GPRS) packet data communication service. In some embodiments, the wireless access point 204 and the wagering game machines 202 can communicate in accordance with the Universal Mobile Telephone System (UMTS) for the next generation of GSM, which can, for example, implement communication techniques in accordance with 2.5G and third generation (3G) wireless standards (See 3GPP Technical Specification, Version 3.2.0, March 2000). In some of these embodiments, the wireless access point 204 and the wagering game machines 202 can provide packet data services (PDS) utilizing packet data protocols (PDP). In other embodiments, the wireless access point 204 and the wagering game machines 202 can communicate in accordance with other standards or other air-interfaces including interfaces compatible with the enhanced data for GSM evolution (EDGE) standards (see 3GPP Technical Specification, Version 3.2.0, March 2000).

In some embodiments, any of the wagering game machines 202 can part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

Example Wagering Game Machine

Figure 3:
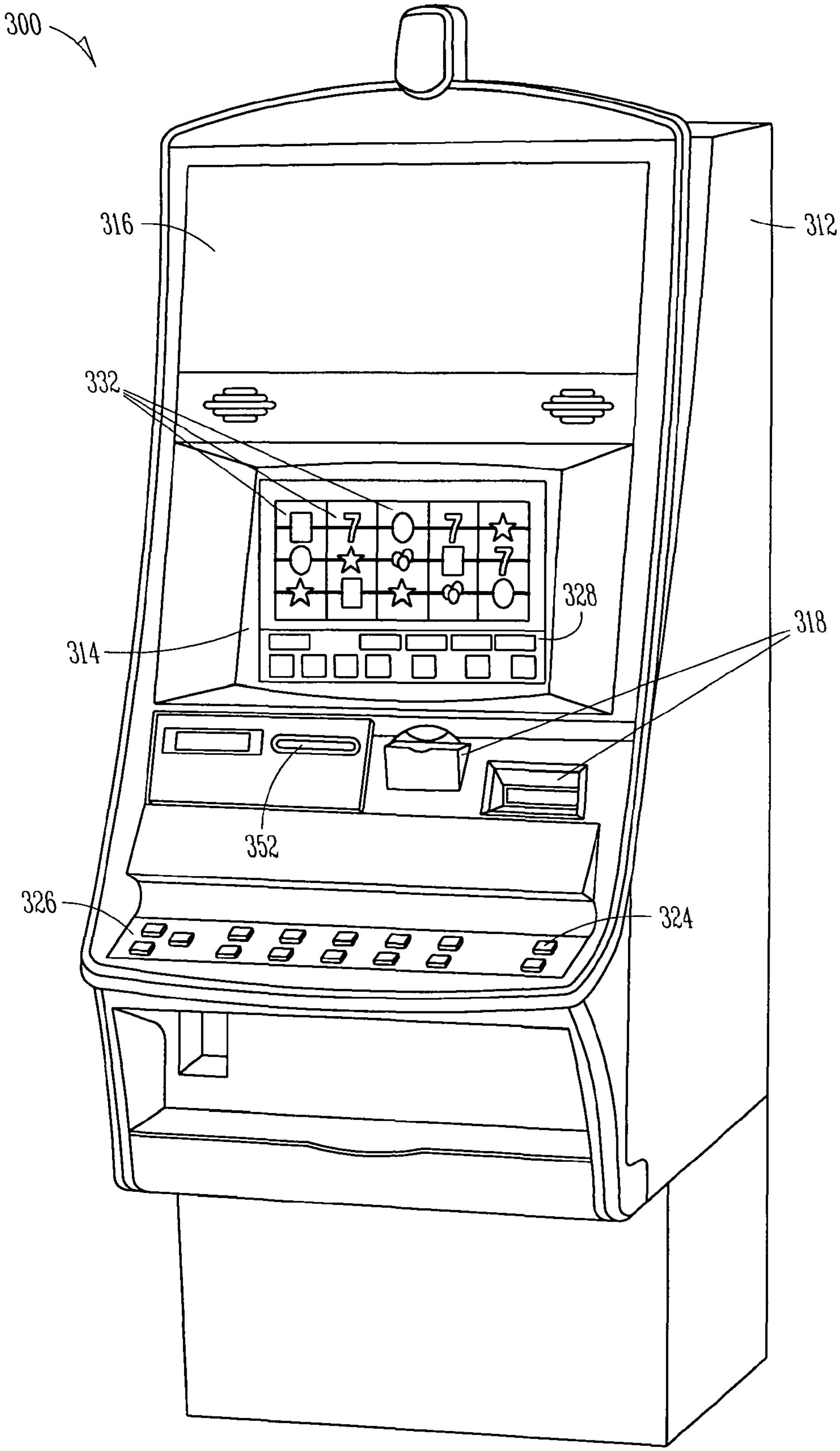
FIG. 3 shows an example embodiment of a wagering game machine.

FIG. 3 is a perspective view of a wagering game machine, according to example embodiments of the invention. Referring to FIG. 3, a wagering game machine 300 is used in gaming establishments, such as casinos. According to embodiments, the wagering game machine 300 can be any type of wagering game machine and can have varying structures and methods of operation. For example, the wagering game machine 300 can be an electromechanical wagering game machine configured to play mechanical slots, or it can be an electronic wagering game machine configured to play video casino games, such as blackjack, slots, keno, poker, blackjack, roulette, etc.

The wagering game machine 300 comprises a housing 312 and includes input devices, including value input devices 318 and a player input device 324. For output, the wagering game machine 300 includes a primary display 314 for displaying information about a basic wagering game. The primary display 314 can also display information about a bonus wagering game and a progressive wagering game. The wagering game machine 300 also includes a secondary display 316 for displaying wagering game events, wagering game outcomes, and/or signage information. While some components of the wagering game machine 300 are described herein, numerous other elements can exist and can be used in any number or combination to create varying forms of the wagering game machine 300.

The value input devices 318 can take any suitable form and can be located on the front of the housing 312. The value input devices 318 can receive currency and/or credits inserted by a player. The value input devices 318 can include coin acceptors for receiving coin currency and bill acceptors for receiving paper currency. Furthermore, the value input devices 318 can include ticket readers or barcode scanners for reading information stored on vouchers, cards, or other tangible portable storage devices. The vouchers or cards can authorize access to central accounts, which can transfer money to the wagering game machine 300.

The player input device 324 comprises a plurality of push buttons on a button panel 326 for operating the wagering game machine 300. In addition, or alternatively, the player input device 324 can comprise a touch screen 328 mounted over the primary display 314 and/or secondary display 316.

The various components of the wagering game machine 300 can be connected directly to, or contained within, the housing 312. Alternatively, some of the wagering game machine's components can be located outside of the housing 312, while being communicatively coupled with the wagering game machine 300 using any suitable wired or wireless communication technology.

The operation of the basic wagering game can be displayed to the player on the primary display 314. The primary display 314 can also display a bonus game associated with the basic wagering game. The primary display 314 can include a cathode ray tube (CRT), a high resolution liquid crystal display (LCD), a plasma display, light emitting diodes (LEDs), or any other type of display suitable for use in the wagering game machine 300. Alternatively, the primary display 314 can include a number of mechanical reels to display the outcome. In FIG. 3, the wagering game machine 300 is an "upright" version in which the primary display 314 is oriented vertically relative to the player. Alternatively, the wagering game machine can be a "slant-top" version in which the primary display 314 is slanted at about a thirty-degree angle toward the player of the wagering game machine 300. In yet another embodiment, the wagering game machine 300 can exhibit any suitable form factor, such as a free standing model, bartop model, mobile handheld model, or workstation console model.

A player begins playing a basic wagering game by making a wager via the value input device 318. The player can initiate play by using the player input device's buttons or touch screen 328. The basic game can include arranging a plurality of symbols along a payline 332, which indicates one or more outcomes of the basic game. Such outcomes can be randomly selected in response to player input. At least one of the outcomes, which can include any variation or combination of symbols, can trigger a bonus game.

In some embodiments, the wagering game machine 300 can also include an information reader 352, which can include a card reader, ticket reader, bar code scanner, RFID transceiver, or computer readable storage medium interface. In some embodiments, the information reader 352 can be used to award complimentary services, restore game assets, track player habits, etc.

Example Wagering Game Machine

Figure 4:
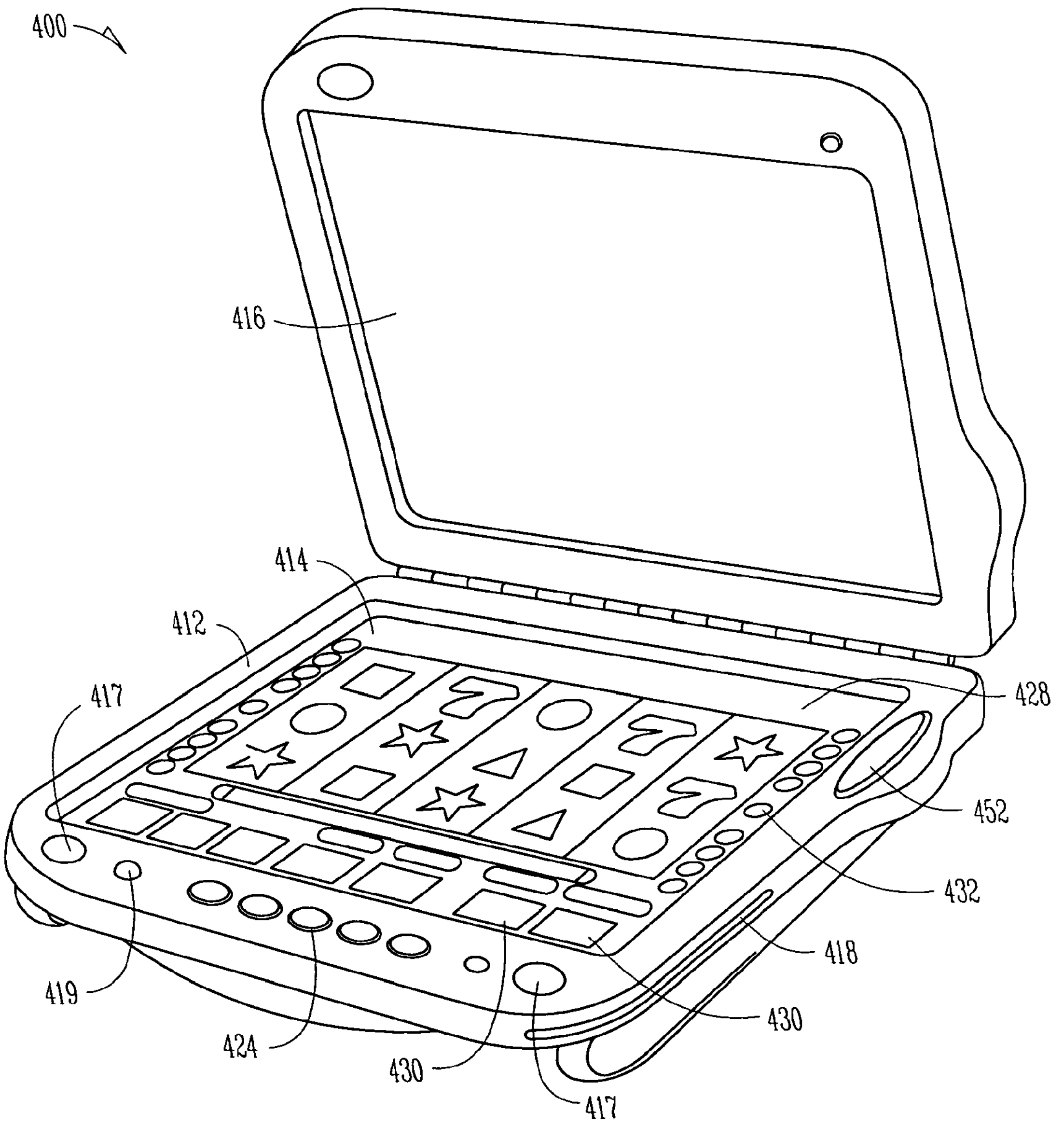
FIG. 4 shows an example embodiment of a portable wagering game machine.

FIG. 4 shows an example embodiment of a wagering game machine 410. Like free standing wagering game machines, in a handheld or mobile form, the wagering game machine 410 can include any suitable electronic device configured to play a video casino games such as blackjack, slots, keno, poker, blackjack, and roulette. The wagering game machine 410 comprises a housing 412 and includes input devices, including a value input device 418 and a player input device 424. For output, the wagering game machine 410 includes a primary display 414, a secondary display 416, one or more speakers 417, one or more player-accessible ports 419 (e.g., an audio output jack for headphones, a video headset jack, etc.), and other conventional I/O devices and ports, which may or may not be player-accessible. In the embodiment depicted in FIG. 4, the wagering game machine 410 comprises a secondary display 416 that is rotatable relative to the primary display 414. The optional secondary display 416 can be fixed, movable, and/or detachable/attachable relative to the primary display 414. Either the primary display 414 and/or secondary display 416 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 418 can comprise, for example, a slot located on the front, side, or top of the casing 412 configured to receive credit from a stored-value card (e.g., casino card, smart card, debit card, credit card, etc.) inserted by a player. The player-accessible value input device 418 can also comprise a sensor (e.g., an RF sensor) configured to sense a signal (e.g., an RF signal) output by a transmitter (e.g., an RF transmitter) carried by a player. The player-accessible value input device 418 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 410.

Still other player-accessible value input devices 418 can require the use of touch keys 430 on the touch-screen display (e.g., primary display 414 and/or secondary display 416) or player input devices 424. Upon entry of player identification information and, preferably, secondary authorization information (e.g., a password, PIN number, stored value card number, predefined key sequences, etc.), the player can be permitted to access a player's account. As one potential optional security feature, the wagering game machine 410 can be configured to permit a player to only access an account the player has specifically set up for the wagering game machine 410. Other conventional security features can also be utilized to, for example, prevent unauthorized access to a player's account, to minimize an impact of any unauthorized access to a player's account, or to prevent unauthorized access to any personal information or funds temporarily stored on the wagering game machine 410.

The player-accessible value input device 418 can itself comprise or utilize a biometric player information reader which permits the player to access available funds on a player's account, either alone or in combination with another of the aforementioned player-accessible value input devices 418. In an embodiment wherein the player-accessible value input device 418 comprises a biometric player information reader, transactions such as an input of value to the wagering game machine 410, a transfer of value from one player account or source to an account associated with the wagering game machine 410, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 418 comprising a biometric player information reader can require a confirmatory entry from another biometric player information reader 452, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 418 can be provided remotely from the wagering game machine 410.

The player input device 424 comprises a plurality of push buttons on a button panel for operating the wagering game machine 410. In addition, or alternatively, the player input device 424 can comprise a touch screen mounted to a primary display 414 and/or secondary display 416. In one aspect, the touch screen is matched to a display screen having one or more selectable touch keys 430 selectable by a user's touching of the associated area of the screen using a finger or a tool, such as a stylus pointer. A player enables a desired function either by touching the touch screen at an appropriate touch key 430 or by pressing an appropriate push button on the button panel. The touch keys 430 can be used to implement the same functions as push buttons. Alternatively, the push buttons 426 can provide inputs for one aspect of the operating the game, while the touch keys 430 can allow for input needed for another aspect of the game. The various components of the wagering game machine 410 can be connected directly to, or contained within, the casing 412, as seen in FIG. 4, or can be located outside the casing 412 and connected to the casing 412 via a variety of wired (tethered) or wireless connection methods. Thus, the wagering game machine 410 can comprise a single unit or a plurality of interconnected (e.g., wireless connections) parts which can be arranged to suit a player's preferences.

The operation of the basic wagering game on the wagering game machine 410 is displayed to the player on the primary display 414. The primary display 414 can also display the bonus game associated with the basic wagering game. The primary display 414 preferably takes the form of a high resolution LCD, a plasma display, an LED, or any other type of display suitable for use in the wagering game machine 410. The size of the primary display 414 can vary from, for example, about a 2-3" display to a 15" or 17" display. In at least some embodiments, the primary display 414 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 414 and/or secondary display 416 can have a 16:9 aspect ratio or other aspect ratio (e.g., 4:3). The primary display 414 and/or secondary display 46 can also each have different resolutions, different color schemes, and different aspect ratios.

As with the free standing embodiments a wagering gaming machine, a player begins play of the basic wagering game on the wagering game machine 410 by making a wager (e.g., via the value input device 418 or an assignment of credits stored on the handheld gaming machine via the touch screen keys 430, player input device 424, or buttons 426) on the wagering game machine 410. In some embodiments, the basic game can comprise a plurality of symbols arranged in an array, and includes at least one payline 432 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 418 of the wagering game machine 410 can double as a player information reader 452 that allows for identification of a player by reading a card with information indicating the player's identity (e.g., reading a player's credit card, player ID card, smart card, etc.). The player information reader 452 can alternatively or also comprise a bar code scanner, RFID transceiver or computer readable storage medium interface. In one embodiment, the player information reader 452 comprises a biometric sensing device.

Example Operation

Figure 5:
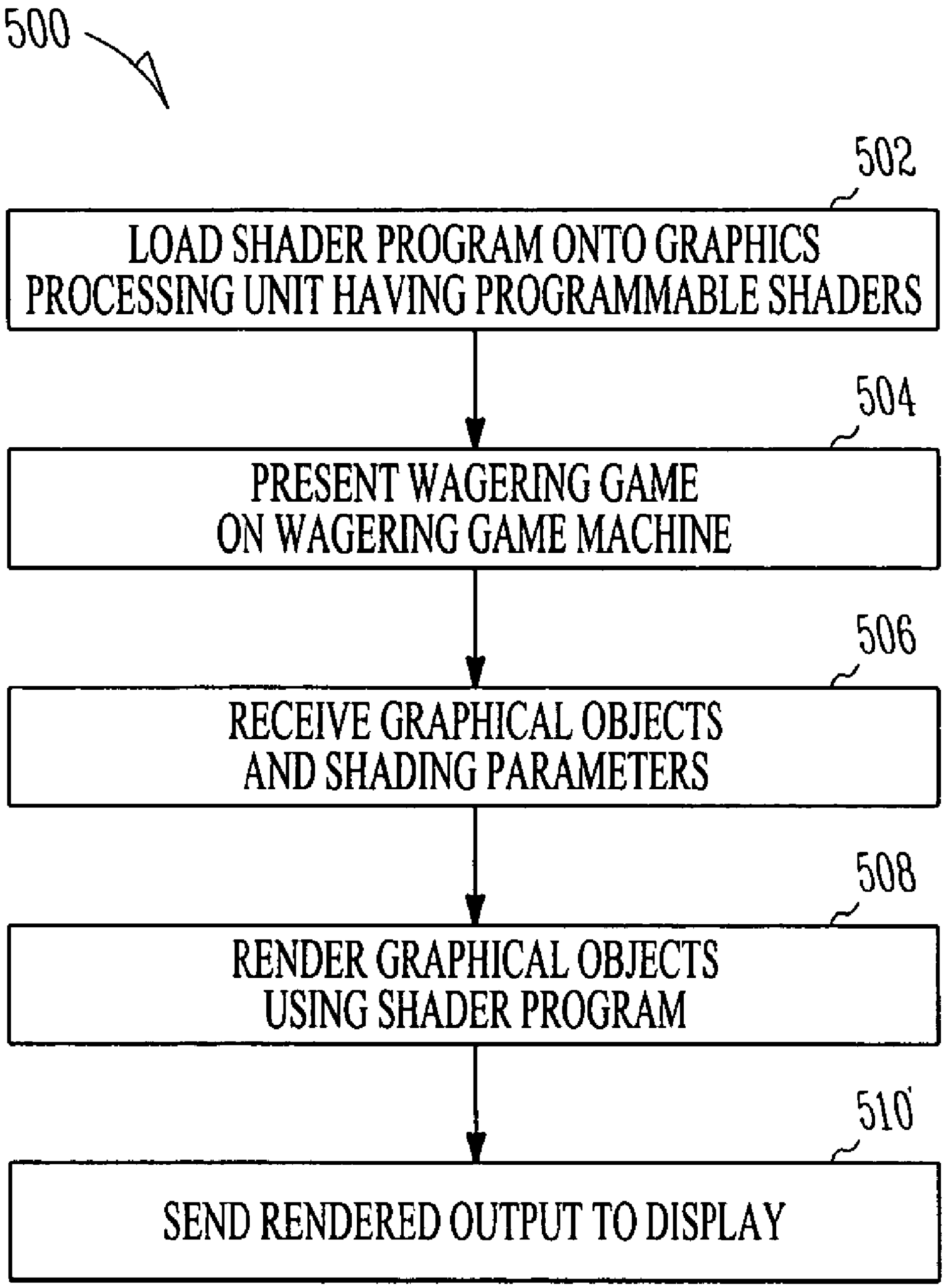
FIG. 5 is a flowchart illustrating a method for operating a wagering game machine using programmable shaders according to embodiments of the invention.

FIG. 5 is a flowchart illustrating a method 500 for operating a wagering game machine using programmable shaders according to embodiments of the invention. The method begins at block 502 by loading a shader program onto a graphics processing unit 154 where the graphics processing unit has programmable shaders 164. The shader program is configured to control the operation of at least one programmable shader 164.

At block 504, in some embodiments the wagering game machine presents a wagering game upon which monetary value may be wagered. The wagering game includes code sent to a graphics processing unit to cause the graphics processing unit to display various graphical objects associated with the wagering game. The graphical objects may include symbols such as reels, dice, cards etc. The graphical object may also include characters, vehicles, game tokens, backgrounds and other items displayed as part of the wagering game or a bonus round for the wagering game. Typically the graphical objects will be defined as three-dimensional objects, although the embodiments are not limited to three-dimensional graphics. In some embodiments, the graphical objects may be generated from a "non-wagering" related program, such as a program generating "attract mode" video, advertising content, or other non-wagering content.

At block 506, a graphics processing unit receives commands and data related to processing the graphical objects. For example, the data defining the object may be received in addition to any lighting, shading, texturing, displacement, transformation, or other commands or parameters related to rendering an image containing the graphical objects.

At block 508 the graphical processing unit assigns at least a portion of the rendering functions to a programmable shader. The programmable shader processes the commands and data in accordance with the previously loaded shader program. As discussed above, various shader programs are possible, including various combinations of vertex shaders, pixel shaders and geometry shaders.

At block 510 the rendered output, including output generated by the programmable shaders, is sent to a display coupled to the graphical processing unit.

Figure 6:
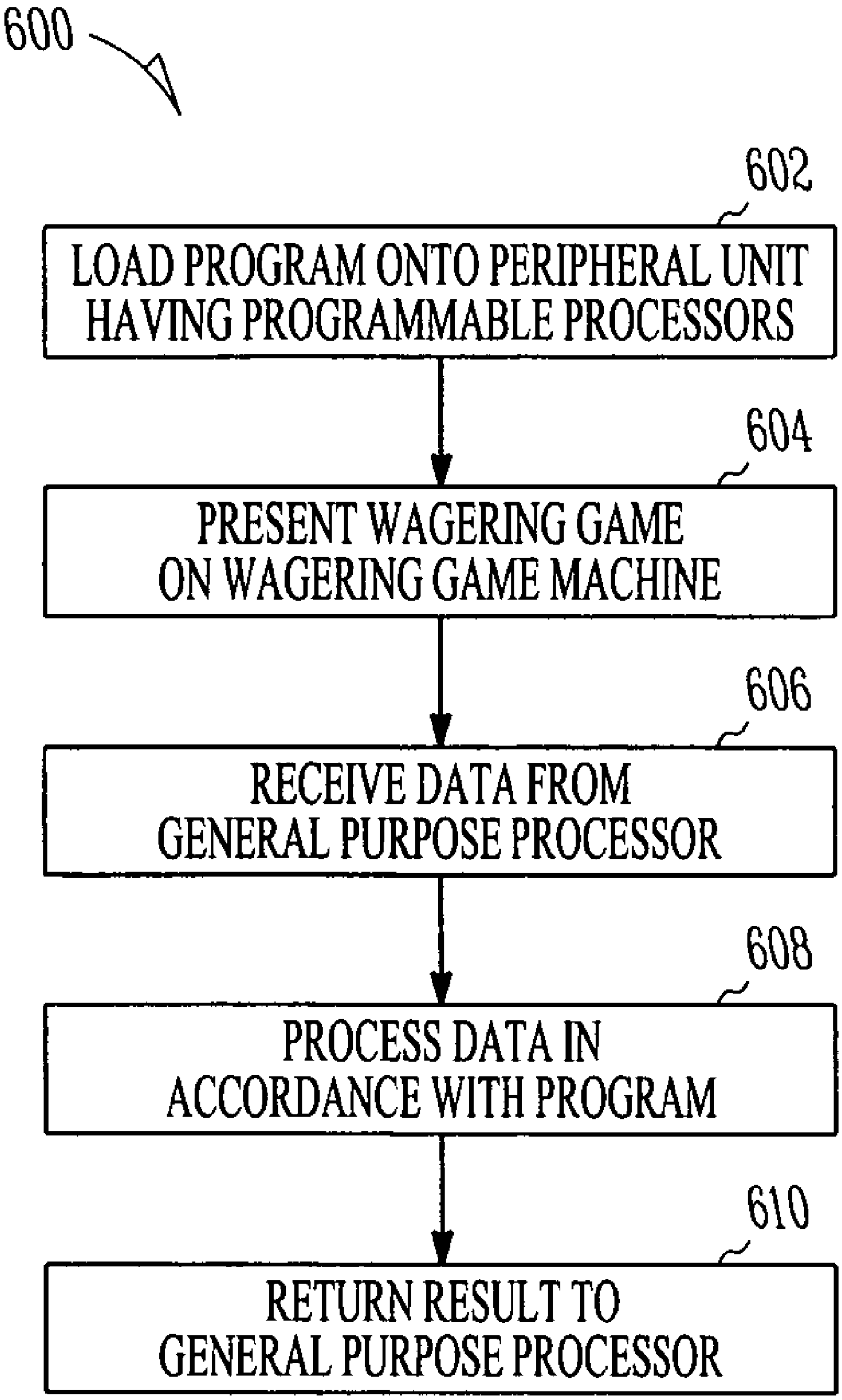
FIG. 6 is a flowchart illustrating a method for operating a wagering game machine using programs loaded onto a wagering game peripheral according to alternative embodiments of the invention.

FIG. 6 is a flowchart illustrating a method 600 for operating a wagering game machine using programs loaded onto a wagering game peripheral according to alternative embodiments of the invention. The method begins at block 602 by loading a program onto a peripheral unit having programmable processors. Typically the peripheral is intended for providing a function associated with a wagering game machine. For example, the peripheral may be an audio processing unit or a graphics processing unit 154. The processors may be specialized for the function of the peripheral, but will typically have enough flexibility in their available commands or data to be used for other purposes. For example, the program may be configured to cause one or more processors on the peripheral to generate a random (or pseudo-random) number. The program may be configured the cause the one or more processors on the peripheral to encrypt, decrypt, or otherwise transform or perform data processing functions on a set of data.

At block 604, in some embodiments, the wagering game machine presents a wagering game upon which monetary value may be wagered.

At block 606, in some embodiments, as part of the presentation of the wagering game, as part of presenting a bonus round, or as part of presenting other content such as attract mode content or advertising content a general purpose processor on the wagering game machine may send data to a peripheral. The data may include commands, parameters, or data to be processed by one or more processors on the peripheral.

At block 608, one or more of the processors on the peripheral interpret the commands or process the data received at block 606 in accordance with the program loaded at block 602. For example, the program may cause one or more of the processors on the peripheral to generate a random (or pseudo-random) number, encrypt data, decrypt data, or otherwise perform a data transformation.

At block 610, the result (or results) of the processing performed by the one or more processors on the peripheral is returned to the general purpose CPU 126, in general for use in presenting a wagering game.

Thus in accordance with the above description, a set of processors on a peripheral such as a graphics processing unit may be loaded with programs that aid in offloading processing that may otherwise be done by a general purpose CPU 126.

GENERAL

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

What is claimed is:

1. A method comprising:
presenting on a first processor a wagering game upon which monetary value may be wagered;
providing a video processing peripheral coupled to the first processor, the peripheral having a memory and a plurality of processors; and
loading a program into the memory for execution by at least one of the plurality of processors.

2. The method of claim 1, wherein the program comprises a shader program.

3. The method of claim 2, wherein the shader program is operable to control the rendering of a graphical object presented as part of the wagering game.

4. The method of claim 1, wherein the program comprises a program operable to provide a non-graphical result to the first processor.

5. The method of claim 4, wherein the program comprises a random number generator.

6. A system comprising:
a first processor operable to present a wagering game upon which monetary value may be wagered;
a video processing peripheral coupled to the first processor, the peripheral having a memory and a plurality of processors; and
a program loaded into the memory by the first processor for execution by at least one of the plurality of processors.

7. The system of claim 6, wherein the program comprises a shader program.

8. The system of claim 7, wherein the shader program is operable to control the rendering of a graphical object presented as part of the wagering game.

9. The system of claim 7, wherein the shader program comprises a vertex shader.

10. The system of claim 7, wherein the shader program comprises a pixel shader.

11. The system of claim 7, wherein the shader program comprises a geometry shader.

12. The system of claim 7, further comprising an audio peripheral having a memory and a plurality of processors and operable to receive a program for execution by at least one of the plurality of processors.

13. The system of claim 6, wherein the program comprises a program operable to provide a non-graphical result to the first processor.

14. The system of claim 12, wherein the program comprises a random number generator.

15. A non-transitory machine-readable medium having machine-executable instructions for causing one or more processors to perform a method, the method comprising:
presenting on a first processor of a wagering game machine a wagering game upon which monetary value may be wagered; and
loading into a memory of a video processing peripheral on the wagering game machine a program for execution by at least one of a plurality of processors on the video processing peripheral.

16. The non-transitory machine-readable medium of claim 15, wherein the program comprises a shader program.

17. The non-transitory machine-readable medium of claim 16, wherein the shader program is operable to control the rendering of a graphical object presented as part of the wagering game.

18. The non-transitory machine-readable medium of claim 15, wherein the program comprises a program operable to provide a non-graphical result to the first processor.

19. The non-transitory machine-readable medium of claim 18, wherein the program comprises a random number generator.

* * * * *